United States Patent [19]
Chaney et al.

[11] Patent Number: 5,881,316
[45] Date of Patent: Mar. 9, 1999

[54] DYNAMIC ALLOCATION OF QUEUE SPACE USING COUNTERS

[75] Inventors: Kenneth Chaney, Plano; Michael T. Ruff, Allen, both of Tex.

[73] Assignee: Hewlett-Packard Company, Palo Alto, Calif.

[21] Appl. No.: 748,226

[22] Filed: Nov. 12, 1996

[51] Int. Cl.⁶ .................................................. G06F 13/00
[52] U.S. Cl. ............................................ 395/876; 370/429
[58] Field of Search ................................. 395/876, 877, 395/873, 849, 200.56, 872, 200.3, 200.62; 370/229, 413, 463, 412–418, 429

[56] References Cited

U.S. PATENT DOCUMENTS

| | | | |
|---|---|---|---|
| 4,788,679 | 11/1988 | Kataoka et al. | 370/413 |
| 4,922,438 | 5/1990 | Ballweg | 370/465 |
| 5,448,701 | 9/1995 | Metz, Jr. et al. | 395/293 |
| 5,473,604 | 12/1995 | Lorenz et al. | 370/229 |
| 5,517,615 | 5/1996 | Sefidvash et al. | 395/182.03 |
| 5,541,932 | 7/1996 | Nguyen et al. | 370/462 |

*Primary Examiner*—Gopal C. Ray

[57] ABSTRACT

The space of a buffer is logically partitioned into space reserved for requests only, space reserved for responses only, and space that can be used for either requests or responses, i.e., dynamically usable as needed by the system. An arbiter uses three registers to keep track of the request buffer space, the response buffer space and the dynamic space. The arbiter compares each of the registers with a corresponding limit to determine if a request packet or a response packet should be sent to the buffer. The limits are set by software and define the maximum number of request products, response packets, and total number of packets the buffer can hold. For example, the limit may be set to eight requests, eight responses and ten total. Thus two spaces are reserved for requests and two spaces are reserved for responses, and six are dynamically usable.

32 Claims, 2 Drawing Sheets

DYNAMIC ALLOCATION OF QUEUE SPACE USING COUNTERS

TECHNICAL FIELD OF THE INVENTION

This invention relates in general to multi-processor computer systems and in particular to the allocation of queue space between requests and responses.

BACKGROUND OF THE INVENTION

In prior systems, there are a certain number of request buffer locations and a certain number of response buffer locations. These buffer locations are fixed in the hardware and not changeable by software. In some systems, the request and response buffer locations are on physically separate hardware devices. Thus, the fixed nature causes an inherent inefficiency in the allocation of buffer space. Basically, the problem is that if a large number of request packets were received which fill up the buffer, additional request packets would have to be halted until the request packet buffer is emptied. This filling and emptying of buffers is time consuming and inefficient.

A consequence of this problem is that the buffer response time is not constant. Then there is a possibility that if a next packet is one of the type that can be sent out and used right away, and there is no buffer space at that time, the packet will be delayed until the buffer becomes open. This problem greatly affects performance of the system.

It is therefore desirable to have a system that makes more efficient use of the available buffer space and reduces the probability that a data packet will be delayed due to congestion in the queue buffers.

It is therefore further desirable to have a system that has more efficient distribution of data packets and positively impacts system performance, by maintaining open queue buffer space, and thus allowing better throughput of data packets.

SUMMARY OF THE INVENTION

The invention partitions a single buffer into space reserved for requests only, space reserved for responses only, and space that can be used for either requests or responses, as needed by the system. Under this arrangement, if at any instant, one of the reserved buffers (requests or responses) goes into overflow, the dual use buffers can be used to keep the data flowing efficiently.

The processor agent chip or PAC has three internal registers that keep track of the status of the buffer space. One counter keeps track of request buffer space, a second counter keeps track of response buffer space, and the third counter keeps track of the total amount of buffer space that is being used. By using the three counters and comparing each of them to three limits, the system is capable of dynamic buffer allocation. The limits are set by software and define the maximum number of request packets that can be in the buffer, the maximum number of response packets that can be in the buffer, and the total number of both request and response packets that can be in the buffer.

Before the PAC sends a request packet, the PAC polls counters to insure that the buffer is not full. The PAC checks the request counter to ensure that the request limit has not been exceeded, and then the PAC checks the total counter to ensure this packet will not exceed the total limit count for that buffer.

For example, assume the limit for the total buffer size is set for ten packets of both response and request types, and the limit for the request count is set for eight packets of the request type. That would mean that the request packet could be sent as long as there is not eight request packets currently in the request buffer and that there is not currently ten total packets of both request and response types in the buffer. This basically means that the request packets are limited to a maximum of eight of ten locations. And consequently, the other two locations are reserved exclusively for the response packets.

Similarly for responses, if the limit for the total buffer size is set for ten packets of both response and request types, and the limit for the response count is set for eight packets of the response type. That would mean that the response packet could be sent as long as there is not eight response packets currently in the response buffer and that there is not currently ten total packets of both request and response types in the buffer. This basically means that the response packets are limited to a maximum of eight of ten locations. Consequently, the other two locations are reserved exclusively for the request packets.

Therefore, with the settings of 8/8/10, two locations are always reserved for requests, two locations are always reserved for responses, and the remaining six locations can be used by for either responses or requests, as needed by the system.

A technical feature of the invention is to use a single buffer for both request buffer space and response buffer space.

Another technical feature of the invention is to reserve some buffer space for only requests, to reserve some buffer space for only responses, and to use the remainder of the buffer space for requests or responses, as required by the system.

A further technical feature of the invention is to use counters to keep track of the status of the different types of buffer spaces, i.e. request, response, and total.

A further technical feature of the invention is to have the allocation of the different types of buffer spaces software adjustable.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
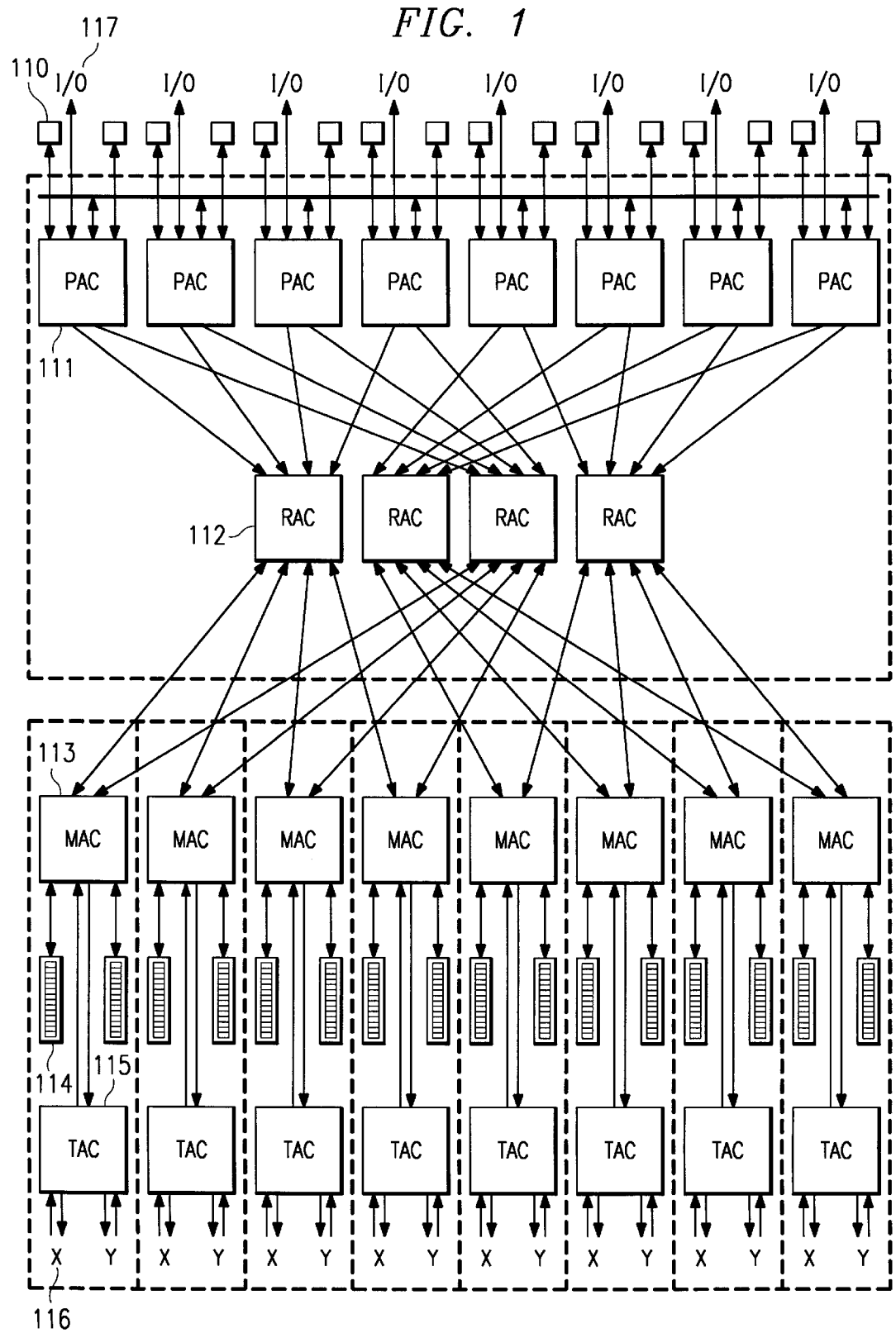
FIG. 1 depicts a single node of a multi-node, multi-processor system that uses the inventive buffer allocation.

FIG. 1 depicts a single node of a multi-node, multi-processor computer system. The overall system may have a plurality of these nodes shown in FIG. 1.

Each node, in the embodiment shown, can support up to sixteen processors 110. These processors are connected to processor agent chips or PACs 111. The function of each PAC 111 is to transmit requests from its associated processors 110 through cross bar router chips (RAC) 112 to the memory access chips (MAC) 113 and then forward the responses back to the requesting processor. Each PAC 111 has an input/output (I/O) subsystem 117. Each MAC 113 controls access to its associated coherent memory 114. When a processor 110 generates a request to access memory (or other resource), the associated PAC 111 sends the request through the proper RAC 112 to a MAC 113. If the request is destined for memory 114 on the local node, MAC 113 accesses the memory attached to it. If the request is destined for memory on another node, MAC 113 forwards the request to TAC 115. TAC 115 is the interface between the node and an SCI ring 116. TAC 115 is also known as a toroidal access chip or a SCI controller. The SCI rings 116 (not shown) interconnect the nodes in the multi-node system.

Figure 2:
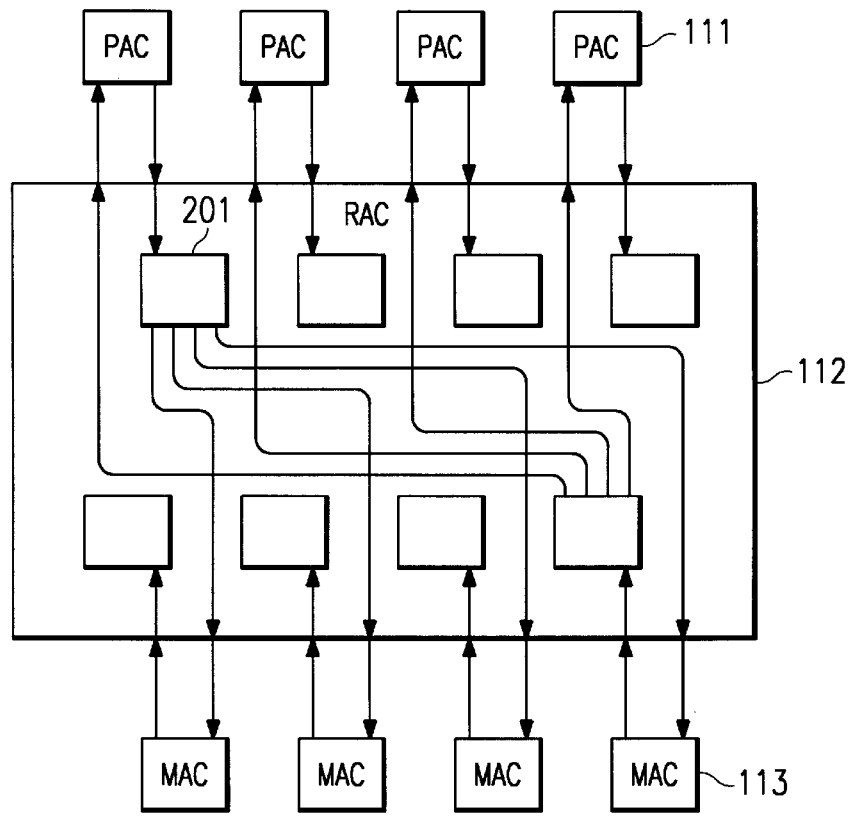
FIG. 2 depicts the arrangement of a single cross bar router chip (RAC)

FIG. 2 depicts a single RAC chip 112 wherethrough packets flow from PAC 111 to MAC 113, and from MAC 113 to PAC 111. RAC chip 112 forms a cross-bar which routes requests and responses in both directions. RAC has four PAC input buffers 201, one buffer associated with a respective PAC. The RAC also has four MAC input buffers, one buffer associated with a respective MAC. Each of the PAC input buffers 201 can hold up to ten packets of both response and request types.

PAC 111 sends a packet to the RAC 112, and where it is held in the PAC input buffer 201 until only RAC can send the packet on to MAC 113. Similarly for the opposite direction, then the MAC tries to send a packet to a certain PAC, it goes through the proper RAC where it first goes into the input buffer on that RAC and is later on forwarded on to the proper PAC. The MAC input buffers are not part of this invention. The PAC input buffers will hereinafter be referred to as buffers.

The processors will make requests for data and provide responses for data. For example, there is a time when processor 110 will make a request for a certain line memory. That request will be forwarded to PAC 111. PAC 111 forwards it to one of the two RACs 112 to which it is connected, and then to the MAC chip 113 that actually has the requested memory line 114. When PAC 111 sends the request to RAC 112, the request is stored in buffer 201, and is later forwarded to the MAC 113. If the request if to a local memory line, MAC will access the memory line from memory and send it back as a response, to the original PAC.

There are also times when processor 110 requests a line memory and the line memory is cached in another processor. In that case, the request goes from PAC 111 to MAC 113, and MAC 113 determines that the line memory is at a remote location, and then sends a request to a second PAC to access the line memory. The second PAC routes the request to the appropriate processor, and then sends back the data from the memory line as a response. So in this scenario, the PAC sends response across the RAC to the MAC, where it is eventual delivered to the first PAC wherein the request originated.

Figure 3:
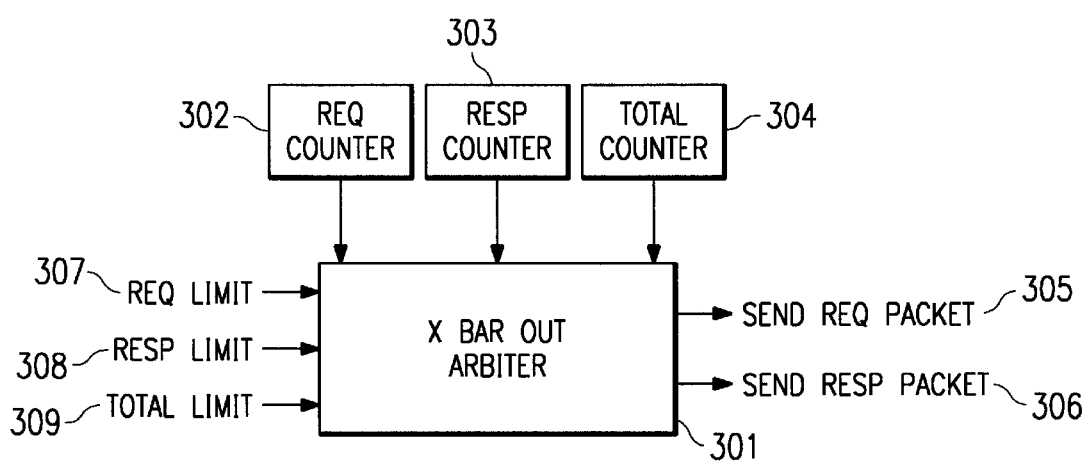
FIG. 3 depicts the arrangement of a cross bar arbiter within the PAC.

FIG. 3 depicts the arrangement of cross bar out arbiter 301 that resides in PAC 111. Arbiter 301, in conjunction with buffer 201 performs the dynamic buffer allocation. Each arbiter 301 has three counter registers 302, 303, 304. Counter 302 is a request counter that keeps track of the total number of requests that are currently in use in buffer 201. Counter 303 is the response counter that keeps track of the total number of responses that are currently in use in buffer 201. Counter 304 is the total counter that keeps track of the total number of buffer locations currently allocated for use by both responses and requests in buffer 201. All three of these counters are used as inputs to cross-bar out arbiter 301.

The other three inputs to arbiter 301 are the buffer limits, which can, if desired, be set by software. Request limit 307 indicates the maximum buffer space that can be used for request packets. Response limit 308 indicates the maximum buffer space that can be used for response packets. Limit 309 indicates the total size of the buffer or the total amount of both response and request packets that the buffer will hold. These three limits cause registers that can be written by the system to allow the limits to be flexible and changeable by software commands.

Cross-bar arbiter 301, using data from the limit inputs and the counter inputs, decides whether to send a request packet or to send a response packet. Suppose, the PAC has an output directing the dispatch of a request packet and another output directing the dispatch of a response packet. If the request limit is greater than the request counter and the total limit is greater than the total counter, then it is safe to send the request packet. If the response limit is greater than the response counter and the total limit is greater than the total counter, then it is safe to send the response packet. However, if one of these groups of conditions is not met, then the PAC can send the packet with the conditions that are met, thus preventing packet jams. Moreover, when the total limit is the same or less than the total counter, the buffer is full and both packets would be held until the RAC sends information stating that it has freed up some of the buffer locations.

The buffer space reserved for request packets is the total limit minus the response limit, for the 8/8/10 arrangement discussed previously. This arrangement yields a reserved request space of two. The buffer space reserved for response packets is the total limit minus the request limit, for the 8/8/10 arrangement discussed previously, yielding a reserved response space of two. The remainder of the buffer space, called the dynamic space is equal to the response limit plus the request limit minus the total limit, for the 8/8/10 arrangement discussed previously and yields a dynamic space of six.

Arrangements other than 8/8/10 are possible, however, at least one space should always be reserved for response packets. Otherwise, if the buffer were to be filled up with requests, no response packets could be moved, and the system could be dead-locked. This would yield a 9/10/10 arrangement, i.e. a maximum of nine requests, a maximum of ten responses, of a ten packet buffer. The 9/10/10 system is the most dynamic system, with a dynamic space of nine. The least dynamic system would be a 5/5/10, with a dynamic space of zero, this effectively is the prior art arrangement.

The 8/8/10 arrangement means at least a total of four spaces are reserved, and six spaces are dynamic. This arrangement has been found to work well at keeping the packets moving. A 7/7/10 is less flexible, with only four locations that are dynamically allocable, because three spaces are reserved for requests and three more for responses.

Whenever the PAC sends a request packet, it increments both the request counter and the total counter. The RAC stores the request until the MAC is ready to receive it. When the request packet, is sent on to the MAC, then the RAC sends a count of the actual number of requests that have been sent out to the MACs. When the PAC receives this count information from the RAC, the PAC subtracts the number of sent out packets from both the request counter and the total counter. Thus, the counters are decremented when the RAC sends out the request.

Whenever the PAC sends a response packet it increments both the response counter and the total counter. The RAC stores the response until the MAC is ready to receive it. When the response packet is sent on to the MAC, then the RAC sends a count of the actual number of responses that have been sent out to the MACs. When the PAC receives this count information from the RAC, the PAC subtracts the number of sent out packets from both the response counter and the total counter. Thus, the counters are decremented when the RAC sends out the response.

The RAC has no knowledge of the actual allocation of the buffer space between request and response. The RAC knows that it is receiving requests and responses packets, and the number of packets of each type being sent out. The RAC sends this information back to the PAC. Buffer 201 is ideally physically one buffer and is broken up logically into request buffers and responses buffers. However, the system could work with multiple physical registers. The RAC knows which buffer locations are which, and which buffer locations currently contain responses, but it does not receive information about the counters and limits in the PAC.

Although the present invention and its advantages have been described in detail, it should be understood that various changes, substitutions and alterations can be made herein without departing from the spirit and scope of the invention as defined by the appended claims.

What is claimed is:

1. A computer system having a processor that creates request packets to access memory and creates response packets that satisfy queries made by the system, the system comprising:

a dynamically allocable buffer space for storing and routing the request packets and the response packets; and an arbiter for receiving the request packets and the response packets from the processor, and for making determinations whether to send the request packets and the response packets to the buffer space;

wherein said determinations are made in part, under control of:

a request counter that stores a number value representing a total number of request packets currently stored in the buffer space;

a response counter that stores a number value representing a total number of response packets currently stored in the buffer space;

a total counter that stores a number value representing a total number of both request packets and response packets currently stored in the buffer space;

a request limit value representing a maximum number of request packets that is capable of being stored in the buffer space;

a response limit value representing a maximum number of response packets that is capable of being stored in the buffer space; and a total limit value representing a maximum number of both request packets and response packets that is capable of being stored in the buffer space.

2. The computer system of claim 1, wherein:

the request limit, the response limit, and the total limit are alterable by software commands.

3. The computer system of claim 2, wherein: the request limit, the response limit, and the total limit are each stored in a respective register.

4. The computer system of claim 1, wherein:

the arbiter compares the request limit with the request counter and compares the total limit with the total counter to determine whether to send the request packet to the buffer space;

if the request limit is greater than the request counter, and if the total limit is greater than the total counter, then the arbiter will send the request packet and increment both the request counter and the total counter;

if the request limit is not greater than the request counter, then the arbiter compares the response limit with the response counter and compares the total limit with the total counter to determine whether to send the response packet to the buffer space; and if the total limit is not greater than the total counter, then the arbiter will send neither the request packet nor the response packet until the total limit is greater than the total counter.

5. The computer system of claim 4, wherein:

the buffer space transmits the request packet to a location in the system after receiving the request packet from the arbiter, and then relays transmission information to the arbiter; and the arbiter receives the transmission information and decrements the request counter and the total counter.

6. The computer system of claim 1, wherein:

the arbiter compares the request limit with the request counter and compares the total limit with the total counter to determine whether to send the request packet to the buffer space;

if the request limit is greater than the request counter, and if the total limit is greater than the total counter, then the arbiter will send the request packet and increment both the request counter and the total counter;

if the request limit is not greater than the request counter, then the arbiter will not send the request packet; and if the total limit is not greater than the total counter, then the arbiter will not send the request packet.

7. The computer system of claim 6, wherein:

the buffer space transmits the request packet to a location in the system after receiving the request packet from the arbiter, and then relays transmission information to the arbiter; and the arbiter receives the transmission information and decrements the request counter and the total counter.

8. The computer system of claim 1, wherein:

the arbiter compares the response limit with the response counter and compares the total limit with the total counter to determine whether to send the response packet to the buffer space;

if the response limit is greater than the response counter, and if the total limit is greater than the total counter, then the arbiter will send the response packet and increment both the response counter and the total counter;

if the response limit is not greater than the response counter, then the arbiter compares the request limit with the request counter and compares the total limit with the total counter to determine whether to send the request packet to the buffer space; and if the total limit is not greater than the total counter, then the arbiter will send neither the request packet nor the response packet until the total limit is greater than the total counter.

9. The computer system of claim 8, wherein:

the buffer space transmits the response packet to a location in the system after receiving the response packet from the arbiter, and then relays transmission information to the arbiter; and the arbiter receives the transmission information and decrements the response counter and the total counter.

10. The computer system of claim 1, wherein:

the arbiter compares the response limit with the response counter and compares the total limit with the total counter to determine whether to send the response packet to the buffer space;

if the response limit is greater than the response counter, and if the total limit is greater than the total counter, then the arbiter will send the response packet and increment both the response counter and the total counter;

if the response limit is not greater than the response counter, then the arbiter will not send the response packet; and if the total limit is not greater than the total counter, then the arbiter will not send the response packet.

11. The computer system of claim 10, wherein:

the buffer space transmits the response packet to a location in the system after receiving the response packet from the arbiter, and then relays transmission information to the arbiter; and the arbiter receives the transmission information and decrements the response counter and the total counter.

12. The computer system of claim 1, wherein:

the request limit is 8;

the response limit is 8; and the total limit is 10.

13. The computer system of claim 1, wherein:

a reserved request space of the buffer space is equal to the total limit minus the response limit;

a reserved response space of the buffer space is equal to the total limit minus the request limit; and a dynamically allocable space of the buffer space is equal to the request limit plus the response limit minus the total limit.

14. The computer system of claim 13, wherein:

the request limit is 8;

the response limit is 8;

the total limit is 10;

the reserved request space is 2;

the reserved response space is 2; and the dynamically allocable space is 6.

15. The computer system of claim 13, wherein:

the request limit is 9;

the response limit is 10;

the total limit is 10;

the reserved request space is 0;

the reserved response space is 1; and the dynamically allocable space is 9.

16. The computer system of claim 13, wherein:

the request limit is 7;

the response limit is 7;

the total limit is 10;

the reserved request space is 3;

the reserved response space is 3; and the dynamically allocable space is 4.

17. A multi-processor computer system having a dynamically allocable buffer space for handling request packets and response packets, the computer system comprising a plurality of nodes interconnected by a plurality of SCI rings, a node of the plurality of nodes comprising:

at least one processor that creates request packets to access memory and creates response packets that satisfy queries made by the system;

a memory for storing data;

at least one processor agent for dispatching packets, and comprising:

an arbiter that receives the request packets and the response packets from the processor and makes determinations whether to send the request packets and the response packets to the buffer space;

at least one memory agent for controlling access to the memory, that receives the packet from the processor agent and determines a target location for that packet; and at least one crossbar for routing the response packets and the request packets between the processor agent and the memory agent, and comprises the buffer space; and wherein when the memory agent determines that the target location is within the node, then the memory agent delivers the packet to the location; and when the memory agent determines that the target location is located on a remote node, then the memory agent forwards the packet to the SCI controller, the SCI controller sends the packet to the remote node through the SCI ring, comprising:

a request counter that stores a number value representing a total number of request packets currently stored in the buffer space;

a response counter that stores a number value representing a total number of response packets currently stored in the buffer space;

a total counter that stores a number value representing a total number of both request packets and response packets currently stored in the buffer space;

a request limit is a number value representing a maximum number of request packets that is capable of being stored in the buffer space;

a response limit is a number value representing a maximum number of response packets that is capable of being stored in the buffer space; and a total limit is a number value representing a maximum number of both request packets and response packets that is capable of being stored in the buffer space.

18. The computer system of claim 17, wherein:

the request limit, the response limit, and the total limit are alterable by software commands.

19. The computer system of claim 17, wherein:

the arbiter compares the request limit with the request counter and compares the total limit with the total counter to determine whether to send the request packet to the buffer space;

if the request limit is greater than the request counter, and if the total limit is greater than the total counter, then the arbiter will send the request packet and increment both the request counter and the total counter;

if the request limit is not greater than the request counter, then the arbiter compares the response limit with the response counter and compares the total limit with the total counter to determine whether to send the response packet to the buffer space; and if the total limit is not greater than the total counter, then the arbiter will send neither the request packet nor the response packet until the total limit is greater than the total counter.

20. The computer system of claim 19, wherein:
the buffer space transmits the request packet to a location in the system after receiving the request packet from the arbiter, and then relays transmission information to the arbiter; and
the arbiter receives the transmission information and decrements the request counter and the total counter.

21. The computer system of claim 17, wherein:
the arbiter compares the response limit with the response counter and compares the total limit with the total counter to determine whether to send the response packet to the buffer space;
if the response limit is greater than the response counter, and if the total limit is greater than the total counter, then the arbiter will send the response packet and increment both the response counter and the total counter;
if the response limit is not greater than the response counter, then the arbiter compares the request limit with the request counter and compares the total limit with the total counter to determine whether to send the request packet to the buffer space; and
if the total limit is not greater than the total counter, then the arbiter will send neither the request packet nor the response packet until the total limit is greater than the total counter.

22. The computer system of claim 21, wherein:
the buffer space transmits the response packet to a location in the system after receiving the response packet from the arbiter, and then relays transmission information to the arbiter; and
the arbiter receives the transmission information and decrements the response counter and the total counter.

23. The computer system of claim 17, wherein:
a reserved request space of the buffer space is equal to the total limit minus the response limit;
a reserved response space of the buffer space is equal to the total limit minus the request limit; and
a dynamically allocable space of the buffer space is equal to the request limit plus the response limit minus the total limit.

24. The computer system of claim 23, wherein:
the request limit is 8;
the response limit is 8;
the total limit is 10;
the reserved request space is 2;
the reserved response space is 2; and
the dynamically allocable space is 6.

25. The computer system of claim 23, wherein:
the request limit is 9;
the response limit is 10;
the total limit is 10;
the reserved request space is 0;
the reserved response space is 1; and
the dynamically allocable space is 9.

26. A method for dynamically allocating buffer space in a computer system, the method comprising the steps of:
accepting request packets to access a memory;
accepting response packets that satisfy queries made by the system;
determining whether to send the request packets and the response packets to the buffer space;
dynamically allocating the buffer space so as to accommodate a maximum number of both request packets and response packets;
storing the request packets and the response packets in the buffer space;
storing a request count representing a total number of request packets currently stored in the buffer space;
storing a response count representing a total number of response packets currently stored in the buffer space;
storing a total count representing a total number of both request packets and response packets currently stored in the buffer space;
storing a request limit representing a maximum number of request packets that is capable of being stored in the buffer space;
storing a response limit representing a maximum number of response packets that is capable of being stored in the buffer space; and
storing a total limit representing a maximum number of both request packets and response packets that is capable of being stored in the buffer space.

27. The method of claim 26, further comprising the step of:
sending the request packets to a location in the system.

28. The method of claim 26, further comprising the step of:
altering the request limit, the response limit, and the total limit, to re-configure the system.

29. The method of claim 26, wherein the step of determining whether to send the request packets and the response packets to the buffer space, further comprises the steps of:
determining whether to send the request packet to the buffer space, comprising the steps of:
comparing the request limit with the request count;
comparing the total limit with the total count;
sending the request packet to the buffer space if the request limit is greater than the request count, and if the total limit is greater than the total count;
incrementing both the request count and the total count;
holding the request packet if the request limit is not greater than the request count; and
holding the request packet if the total limit is not greater than the total count.

30. The method of claim 29, further comprising the steps of:
transmitting the request packet out of the buffer space and to a location in the system; and
decrementing both the request count and the total count.

31. The method of claim 26, wherein the step of determining whether to send the request packets and the response packets to the buffer space, further comprises the steps of:
determining whether to send the response packet to the buffer space, comprising the steps of:
comparing the response limit with the response count;
comparing the total limit with the total count;
sending the response packet to the buffer space if the response limit is greater than the response count, and if the total limit is greater than the total count;
incrementing both the response count and the total count;
holding the response packet if the response limit is not greater than the response count; and
holding the response packet if the total limit is not greater than the total count.

32. The method of claim 31, further comprising the steps of:
transmitting the response packet out of the buffer space and to a location in the system; and
decrementing both the response count and the total count.

* * * * *